March 8, 1955   G. P. HARNWELL   2,703,677
VECTOR CALCULATING RULE

Filed May 13, 1944   4 Sheets-Sheet 1

*INVENTOR.*
GAYLORD P. HARNWELL
BY George Sipkin
B. L. Fanquill
ATTORNEYS

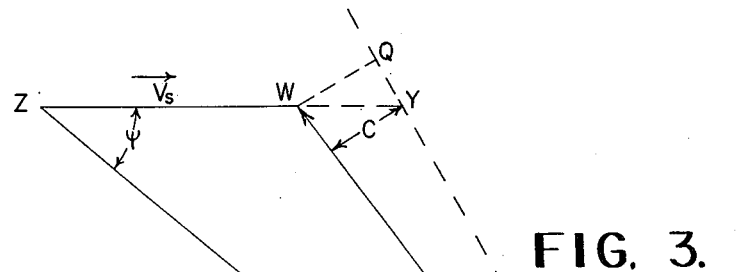
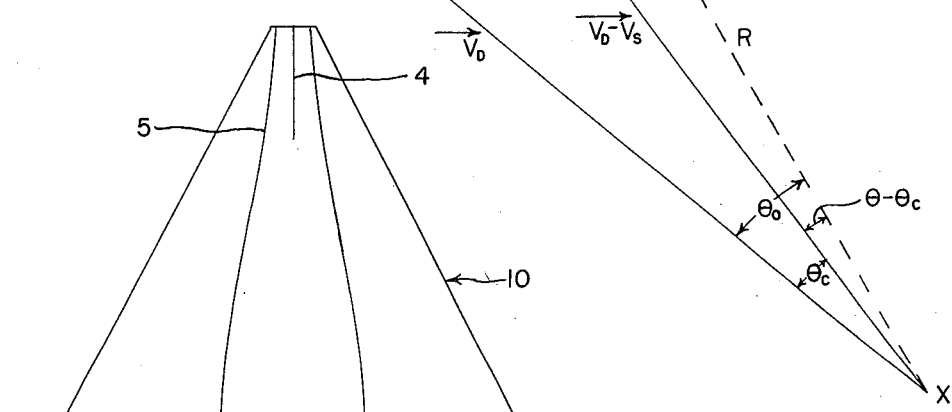
FIG. 3.
FIG. 4.
INVENTOR.
GAYLORD P. HARNWELL
BY
ATTORNEYS

INVENTOR.
GAYLORD P. HARNWELL

March 8, 1955 — G. P. HARNWELL — 2,703,677
VECTOR CALCULATING RULE
Filed May 13, 1944 — 4 Sheets-Sheet 4
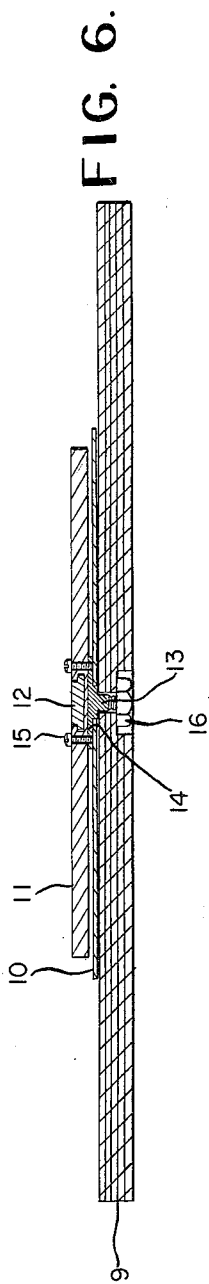
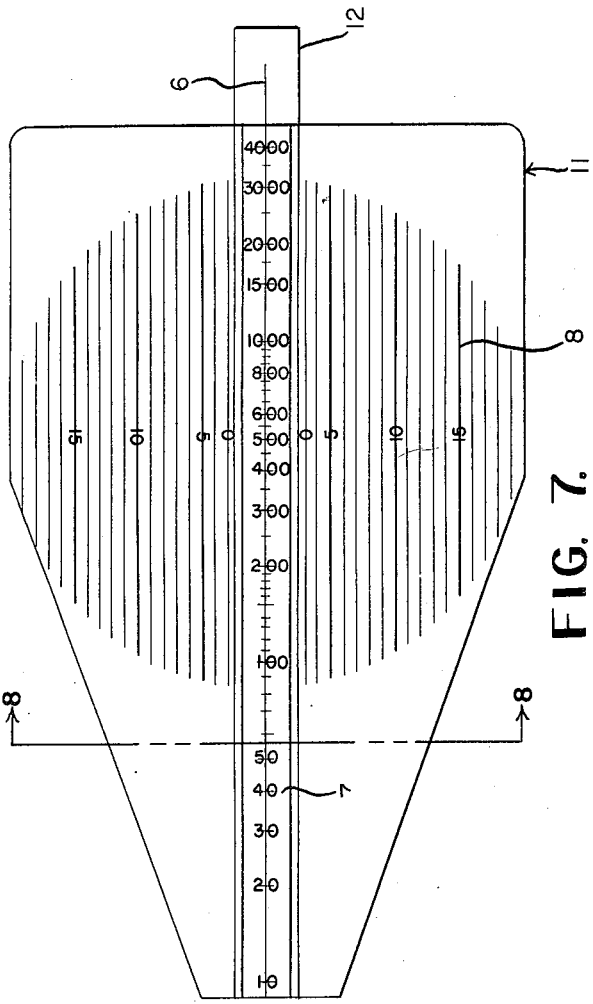
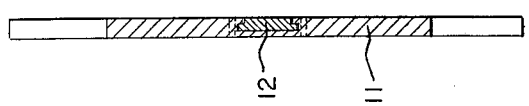
*INVENTOR.*
GAYLORD P. HARNWELL
BY George Sipkin
B. L. Zangwill
ATTORNEYS

United States Patent Office 2,703,677
Patented Mar. 8, 1955

2,703,677

VECTOR CALCULATING RULE

Gaylord P. Harnwell, La Jolla, Calif., assignor to the United States of America as represented by the Secretary of the Navy Application May 13, 1944, Serial No. 535,472

8 Claims. (Cl. 235—61)

This invention relates to a vector calculating rule.

In many cases in engineering design fields where it is desired to study the relationship between two points moving relative to one another in a plane, comparatively complex calculations must often be made. Among the most important of these quantities which are so studied are the distances between such two points at any particular instant of time, the rate of change of such distance, the vector velocities of such points and the angle between such vector velocities. The present invention consists of a means and method for automatically calculating the magnitude of these values as other of the values are changed. For example, if the initial positions and vector velocities of two points are determined and it is desired to obtain their relative positions, velocities, distance apart, or rate of change of such distance, after a certain interval has elapsed (or at a subsequent point when one of the various quantities is known), the vector calculating rule described herein provides a means for doing so.

A particular application of the invention which has proven to be extremely useful is one which is used in conjunction with the device described in a patent application entitled, "Attack Training Device," executed on July 15, 1943, by Firth Pierce, George A. Brettell, Jr., Melvin O. Kappler, Clark F. Bradley, and filed May 16, 1944, Serial No. 535,858. That disclosure described a device and method for introducing into the receiver of echo-ranging gear certain signals intended to simulate the echoes received from targets, such as submarines. The purpose of this invention was to train students in the operation of sound gear and consisted in means for varying the character of the simulated signal so that the effect of alterations in course and speed of the submarine and searching ship were likewise simulated. Since the character of the echo received is directly effected by the relative positions and motions of the two vessels, it is obvious that such quantities as the distance between the two vessels (range), the rate of range change, the relative bearing of one with respect to the other, and their vector velocities are important. Not only are the individual effects of these quantities of interest, but the manner in which they vary with respect to one another is very helpful in learning to recognize (from the character of the echo) the maneuvers which submarine and searching ship execute.

Thus, since the invention is useful in determining these various and relative quantities it provides a useful tool for accurately setting the various dials on the attack training device. For example, if the simulated range is increasing, there will be a downward frequency shift in the simulated echo signal as well as a regular shift in relative bearing (unless submarine and searching ship have the same or opposite courses). For this reason one of the objects of the invention is a device which provides means for determining the relationship between various changes in the above-mentioned quantities so that they may be properly maintained on the dials of the attack training device.

Another of the objects of the invention is a device for determining the relationship between range, relative bearing and range rate as the submarine and searching ship maneuver with respect to one another.

Still another object is a device which provides means for accurately maintaining these relationships between varying characteristics of the simulated echo signal.

An even further object of the invention is a means for predicting points and positions at and under which an anti-submarine attack should be launched.

Yet another object of the invention is a means for checking the correctness of the procedure adopted by a ship for locating and destroying a submarine.

Most of the particular objects set forth above are limited in application to submarine warfare, but it will be obvious as the description progresses that the invention has a wider application to the study of any two moving points moving in a single plane. For convenience, the description will largely deal with the application made to submarine warfare, but it is to be clearly understood that in all cases where the submarine and searching ship are referred to, moving points could be substituted for them and that the same relationships determined would be the same in any general case.

In the drawings:

Figure 3 is a diagram in which the vector and actual diagrams of Figs. 1 and 2 are superposed.

Figure 4 is a plan view of one portion of vector calculating rule showing the plot of relative bearing and range.

Figure 6 is a sectional view of the vector calculating rule along the line 6—6 of Figure 5.

Figure 7 is a plan view of one of the elements of the vector calculating rule shown in Fig. 5.

Figure 8 is a sectional view of the element along the line 8—8 of Fig. 7.

Before describing the vector calculating rule, it is necessary that the type of problem which it solves be clearly understood. For this purpose, the above cited example of the submarine and searching ship have been chosen for convenience as they simply illustrate any two moving points.

In conventional anti-submarine practice, and after the bearing and range of the submarine has been determined as accurately as possible, a course is steered directly for the submarine. This course may be changed at intervals, if the motion of the submarine causes its bearing, relative to the searching ship, to change. At some moderate range, the conning officer of the searching ship gives orders to steer a new course which, if maintained, will bring the ship to a position, with respect to the submarine, for an attack. This is ordinarily not a collision course (which brings the ship directly over the submarine) but one which causes the ship to pass near to the submarine at a predetermined range and bearing depending upon the kind of attack to be launched.

Figure 1:
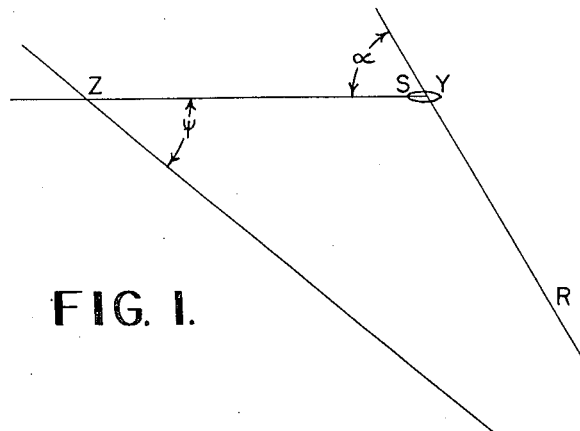
Figure 1 is a diagram showing the initial paths of a moving ship and submarine.

This procedure is illustrated diagramatically in the figures. In Fig. 1, the submarine S is shown at point Y and the searching ship or destroyer D is shown at point X. The submarine is assumed to be proceeding along the course YZ at velocity Vs. The destroyer D has just altered its course from the course XY through a lead angle $\theta_0$ to a new course XZ with velocity $V_D$.

As the two vessels proceed along their respective courses the relative bearing $\theta$ of the submarine S, with respect to the destroyer, and the distance R between the two, change in a manner determined by the velocities and directions of motion of the two vessels. Likewise, the rate at which the range (the distance between the two) changes varies, i. e., the range change is not constant.

When the submarine S and destroyer D are positioned as at points Y and X, the destroyer has determined the range, relative bearing and direction of motion of the submarine, as well as the angle $\alpha$ measured counter-clockwise between the course of the destroyer and course of the submarine. Knowing this, the destroyer has altered course through the lead angle $\theta_0$ (giving the submarine a relative bearing of $\theta_0$ or $360°-\theta_0$) to establish the course angle $\psi$ which is the angle measured counter-clockwise between the course of the destroyer and the course of the submarine after the lead angle has been introduced.

Figure 2:
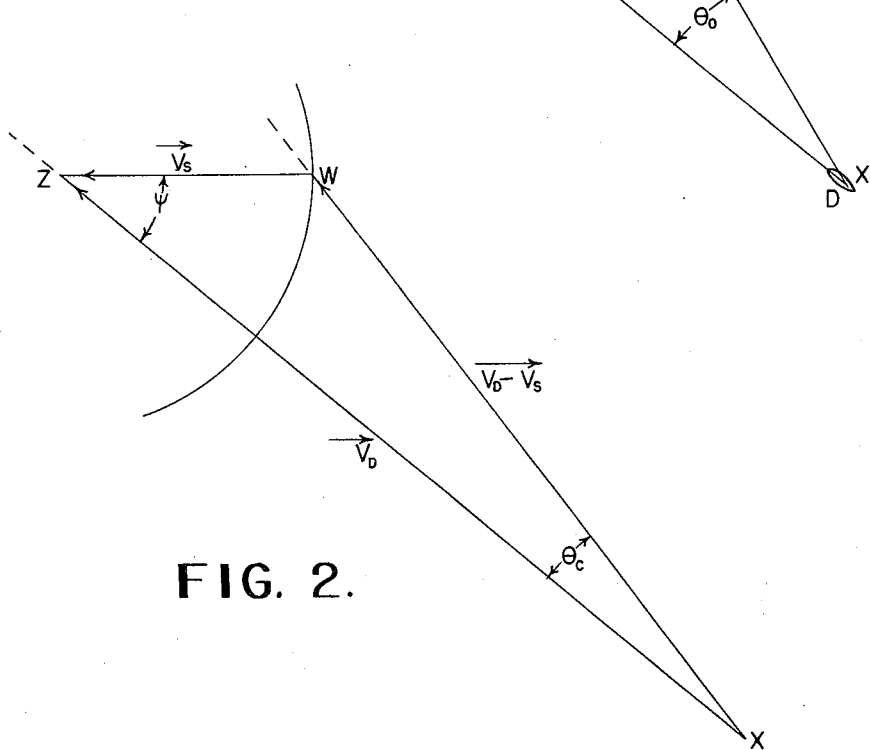
Figure 2 is a vector diagram of the velocities of the ship and submarine of Fig. 1.

This situation may be represented in the vector diagram of Fig. 2. In this case $\vec{V_D}$ and $\vec{V_S}$ are vectors representing the directive velocities of the destroyer and submarine, respectively, which, of course, are separated by the angle $\psi$. The vector $\overrightarrow{V_D - V_S}$ which represents the difference between $\vec{V_D}$ and $\vec{V_S}$ is the relative velocity of the destroyer with respect to the submarine and bears an angle $\theta_c$ to the vector $\vec{V_D}$. Thus, it is obvious that if the angle $\psi$ remains the same, angle $\theta_c$ (called the collision course angle) is the lead angle through which the destroyer D would have to turn to steer a collision course.

If Figs. 1 and 2 are combined so that the course angle $\psi$ and point Z are superposed, as in Fig. 3, it is apparent that a new angle $(\theta - \theta_c)$ becomes of interest. Insofar as the vector portion of the diagram is concerned, it can be assumed that the submarine S remains at rest at point Y, and the destroyer D proceeds along the line XW which is the relative velocity vector $\overrightarrow{V_D - V_S}$. From this it can be readily seen that the distance of closest approach $$C = R \sin(\theta - \theta_c) \qquad (1)$$

is constant, since there is no component of relative velocity except in the direction of XW (see Fig. 3). Also, it can be seen that the rate at which the range between the destroyer D and the submarine S changes is equal to $$-\frac{dR}{dt} = XQ = \left|\overrightarrow{V_D - V_S}\right| \cos(\theta - \theta_c) \qquad (2)$$

which is the component of the relative velocity vector $\overrightarrow{V_D - V_S}$ along the direction of the relative bearing of the submarine S.

From Eq. 1, the following may be written:

$$R = \frac{C}{\sin(\theta - \theta_c)} = C \csc(\theta - \theta_c)$$

$$\log R = \log C + \log \csc(\theta - \theta_c) \qquad (3)$$

The polar plot of this equation can be seen in Fig. 4. Thus, for any given value of $(\theta - \theta_c)$ or R, it is possible to determine the value of the other variable.

The above calculations illustrate the fact that if the vector velocities $\vec{V_S}$ and $\vec{V_D}$ of the submarine S and destroyer D, the range R and the lead angle $\theta_0$ are known at the time that the lead angle is introduced, facts are available from which two of the three quantities range, relative bearing and range rate may be determined at any other subsequent point in the problem, if the third quantity is known. Thus, if the destroyer D and submarine S move to new positions (in Fig. 1), and the new range is known, it is possible to determine the relative bearing and the range rate $$-\frac{dR}{dt}$$

at that point in the problem. This is necessarily true since Fig. 4 shows the relationship between R and $\theta$ and Eq. 2 shows that the range rate is equal to the component of $$\left|\overrightarrow{V_D - V_S}\right|$$

at an angle $(\theta - \theta_c)$ to such vector.

Figure 5:
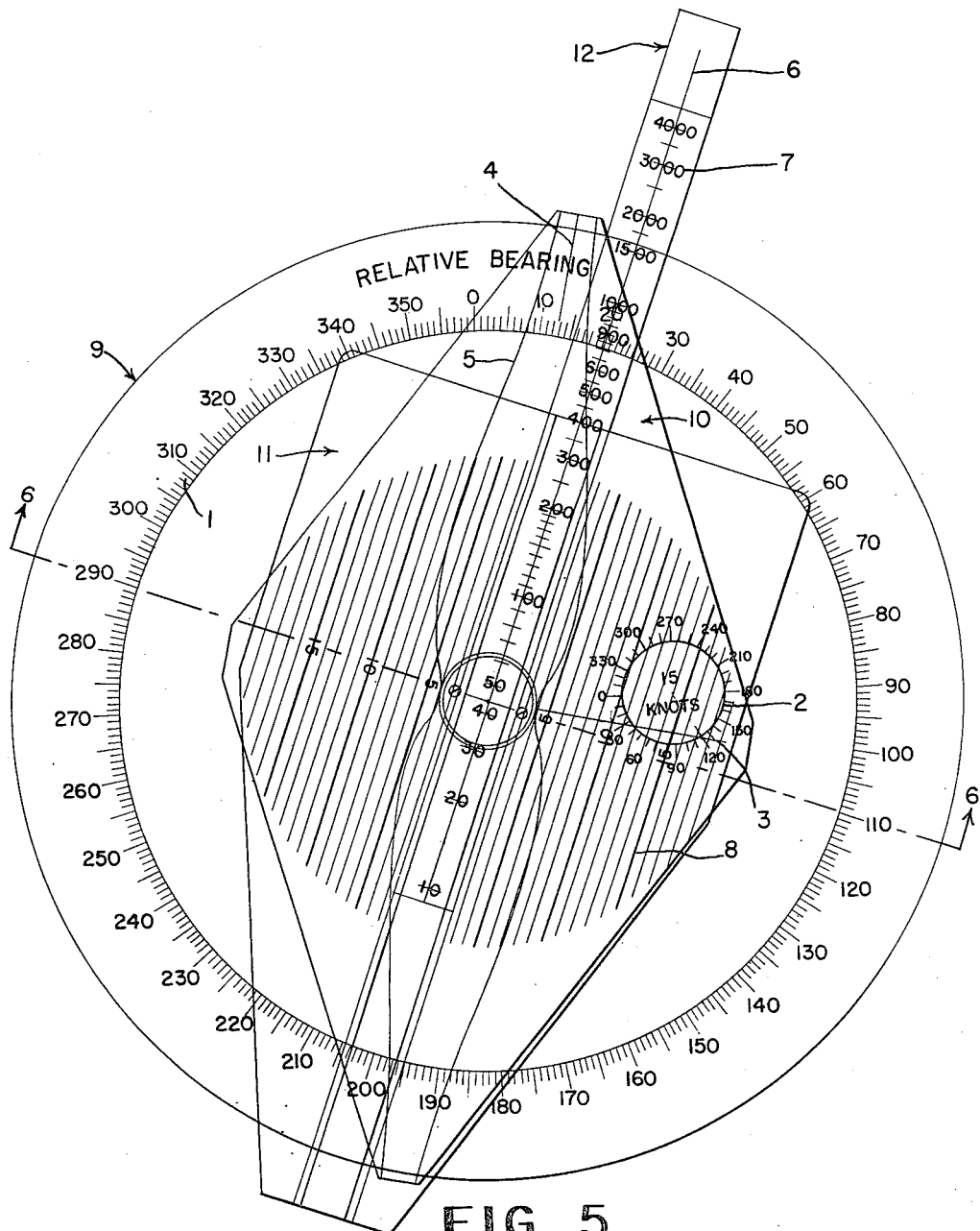
Figure 5 is a plan view of the complete vector calculating rule used in echo-ranging procedure.

The vector calculating rule used to calculate these values is illustrated in Fig. 5. The scales will be first described and a method of mounting them will be subsequently set forth.

A relative bearing scale 1 is ruled on the circumference of a circle and is divided into 360°. Within the scale 1 is another smaller course angle scale 2 which is divided into a convenient number of divisions (say 36, representing 10° angles). If the center of scale 1 is called X, the center of scale 2 is called Z, a vector diagram similar to Fig. 2 may be established. If the distance XZ between the centers of the scales represents the vector $\vec{V_D}$, and the radius of scale 2 represents vector $\vec{V_S}$, the distance from X, the center of scale 1, to a point W on the circumference of scale 2 will represent the vector $\overrightarrow{V_D - V_S}$ of Fig. 3 (it should be noted that 0° on scale 2 points directly at, rather than away from, the center X of scale 1 in order that the vectors are subtracted and not added). Thus, if an index line 3 is provided for rotation about the center X of scale 1, it may serve to determine the magnitude and direction of the vector $\overrightarrow{V_D - V_S}$. If extended to intersect scale 1, it could enable the collision course angle $\theta_c$ to be read on that scale. However, for convenience, a pointer line 4 mounted for rotation with index line 3, but positioned 90° from it, is used. This accounts for the fact that scale 1 is also rotated through the same 90° angle (with respect to scale 2) in the figures. The calculations might well be made by extending line 3 to the scale 1 and shifting scale 1 back through 90° from its position as shown, but the form shown is more convenient.

From the calculations above, it is known that the angle $(\theta - \theta_c)$ must be known before calculations can be made. Since pointer line 4 determines $\theta_c$ as measured on the relative bearing scale 1, the plot 5 of the function of Eq. 3 may be mounted for rotation with pointer line 4 where the pointer occupies the position in the plot where $(\theta - \theta_c) = 0$. If a range line 6 is mounted for separate rotation about point X, it is possible to read range where such range line crosses the plot 5 for any significant relative bearing angle (as read where the same line intersects scale 1). Conversely, the relative bearing may be determined, if the range is known.

Since when the destroyer D is at point X and the submarine S is at point Y, the vector velocity diagram may be established by means of scales 1, 2, and index line 3, and since $\theta_c$ and $\theta$ are known ($\theta$ being equal to the lead angle $\theta_0$ under such conditions), the pointer line 4 may be set at $\theta_c$ on the relative bearing scale 1 and the range line 6 may be set to pass through $\theta_0$ on the same scale, with the range line 6 intersecting plot 5 at the particular range R established by the initial conditions. The range scale 7 (along range line 6) represents the log R coordinate of the plot 5 and is made slidable along range line 6 for proper adjustment.

As the problem progresses and the value of $(\theta - \theta_c)$ changes, range line 6 and range scale 7 are rotated (but not moved radially) and at any relative bearing, the range may be read from its intersection with the plot 5.

Since the range rate from Eq. 2 equals $$\left|\overrightarrow{V_D - V_S}\right| \cos(\theta - \theta_c)$$

it is also possible to establish a range rate scale 8 perpendicular to range line 6 (and mounted for rotation therewith) which will read this cosine component of the vector $\overrightarrow{V_D - V_S}$ represented by the index line 3, extending from the center X of scale 1 to the point W on the circumference of scale 2. The range rate scale 8 is, of course, drawn to the same scale as the vector velocities just mentioned.

Although the mechanical construction of the vector calculating rule is not intended to limit the scope of the invention, the embodiment shown in Figs. 5 and 6 will be described.

The relative bearing scale 1 is mounted, printed or glued on a circular disk 9 which, for convenience, may be six to eight inches in diameter. The course angle scale 2 may be secured in a stationary position on disk 9 in a similar manner, as shown in Fig. 5. In this connection, since the distance between the centers of scales 1, 2 represents the magnitude of vector $\vec{V_D}$, it may be convenient to form scale 2 on an insert which slides radially on or in a slot in disk 9. Thus, scale 2 may be positioned along such a radius at a distance from the center X of scale 1 representing any reasonable magnitude of the vector $\vec{V_D}$ (which may vary depending upon the kind of searching ship D, or the kind of attack made). Also since in the vector diagram only the relative magnitudes of vectors $\vec{V_D}$ and $\vec{V_S}$ are important, the adjustment made in the position of the center of scale 2 (its radius remaining fixed) makes any relationship between the magnitudes of vectors $\vec{V_D}$ and $\vec{V_S}$ possible. This, of course, would necessitate several range scales 7 being positioned along the range line 6. Another form for the scale 2 consists in positioning several concentric scales around the same point and the variation is thus accomplished through changing the relative magnitude of vector $\vec{V_S}$, rather than $\vec{V_D}$. Likewise, two or more separate scales, positioned at various distances from the center X of scale 1 might be used.

Index line 3, pointer line 4 and the plot 5 of the curve of Eq. 3 are conveniently formed on a thin transparent sheet 10. This may be formed from glass, Celluloid, plastic or other convenient material and may be circular and of the same diameter as disk 9. However, it has been found very convenient to trim sheet 10 into a substantially diamond-shaped parallelogram as shown in Fig. 4.

Range line 6, range scale 7 and range rate scale 8 are all conveniently mounted or printed on a second transparent element 11, as shown in Figs. 7 and 8. The range line 6 and range scale 7 are both positioned on a slider 12 which is adapted to slide in a slot in element 11 as shown in Fig. 7, which slider is positioned centrally of the sheet.

The various elements are all mounted for separate rotation about a central pin 13, as shown in Fig. 6. Pin 13 is formed with a wide flange or head 14 at its end to which element 11 is fixed by any convenient means such as screws 15. Pin 13 also is provided with a small flange just below head 14 about which sheet 10 is adapted to fit and rotate as a center. The lower end of pin 13 fits into a central hole in disk 9 and carries a nut 16 on its lower threaded end. Thus, disk 9, and sheets 10, 11 may all rotate independently.

As has been briefly mentioned heretofore, the present invention provides a very convenient means for determining values to be set on the dials on the attack training device disclosed in the above identified patent application by Firth Pierce, George A. Brettell, Jr., Melvin O. Kappler and Clark F. Bradley. In that device various controls are provided by means of which an instructor may introduce echo signals into the receiver of echo-ranging gear, which signals simulate the echoes of a submarine, as the submarine and searching ship change position with respect to one another. For instance, if the submarine or destroyer alters its course or speed, one or more effects may be noticeable, such as changes in the relative bearing of the submarine, the amount of the frequency shift of the echo caused by the Doppler effect, the range, the range rate, the intensity and duration of the echo, etc.

However, these changes are related to one another and the present invention provides means for maintaining the proper relationship between them as they change. Assume, for example, that it is desired to establish the problem and simulate the conditions produced thereby as illustrated in Fig. 1. In this case, before the destroyer D turns through the lead angle $\theta_0$, it is known that the speeds of the destroyer and submarine are 15 and 4 knots, respectively. This properly corresponds to the settings of the vector calculating rule illustrated in Fig. 5 where the distance between the center of scales 1, 2 represents 15 knots and the radius of scale 2 represents 4 knots. Assume also that before the lead angle is applied, the destroyer D is proceeding on the course XY and the submarine on the course YZ, which are at an angle of $\alpha=60°$ apart.

It has been shown that the destroyer has determined that the submarine is drifting to the left and that its range $R=550$ yards. Assume also that the destroyer turns through a lead angle $\theta_0=20°$, which determines the course angle $\psi=40°$. With these conditions given, the index line 3 will be set at 40° on scale 2; and from the intersection of pointer line 4 with relative bearing scale 1, it can be determined that the proper collision course angle $\theta_c$ is approximately 12.5°. (This is also illustrated in the settings on the slide rule in Fig. 5.)

Element 11 carrying slider 12 is then rotated until the range line 6 rests on the relative bearing scale 1 at 20°, which is the lead angle $\theta_0$. Slider 12 is then moved radially until the range scale 7 shows that the 500 yard mark is superposed at the intersection of the plot 5 and range line 6, as is illustrated in Fig. 5. The range rate at this initial point is determined by noting where the point W, at which index line 3 was set on scale 2, falls on the range rate scale 8. Under these conditions, Fig. 5 shows that this value is 12 knots.

Since the instructor who is operating the controls of the attack training device disclosed in the above identified application is also operating the present invention, he will now set the "bug dial" on the relative bearing scale on the attack training device at 20°, which is both the lead angle $\theta_0$ and the relative bearing angle under the initial conditions. Also, the range and range rate dials on the attack training device will be set at 500 yards and 12.1 knots, respectively. Since it can be seen from Figs. 1, 2, 3 that the range is a closing one, the Doppler knob on the attack training device will be set to give an up-Doppler reading.

In the progression of the problem, the range dial on the attack training device will be automatically rotating, (showing smaller and smaller values) at a rate determined by the initial 12.1 knot setting on the range rate dial. The instructor determines a new range at which he will make the next setting of the attack training device and rotates element 11 to determine the relative bearing and range rate at such anticipated range. When the range dial on the attack training device shows that this range has been reached, the instructor resets the "bug dial" and the range rate dial on that device at positions determined by the readings of the vector calculating rule. Another anticipated range is then chosen and the process repeated until the range is at a minimum (which may also be determined on the vector calculating rule by reading the minimum range on range scale 7 at which the plot 5 intersects the range line 6, which in the example case is about 65 yards). At this point the relative bearing will be about 102° and the range rate (since the range is at a minimum) will be zero. Of course, all during this period the Doppler control on the attack training device may be regulated in a similar manner to show a frequency shift (of proper direction) in the echo signal proportional to the range rate.

As the range passes the minimum and the problem continues the range will begin to increase, the rate of range change will take on the opposite sign and the relative bearing angle will continue to increase, as will be obvious to those skilled in the art.

It is thus seen that the vector calculating rule provides exact information with respect to an established problem so that an instructor may regulate the controls on the attack training device to simulate to a high degree of accuracy the changing conditions met in an actual attack. Without the vector calculating rule, the regulation by the instructor would necessarily be somewhat haphazard and would depend on his ability to guess the proper values at any particular time.

It will also be obvious to those skilled in the art that it is possible to utilize the vector calculating rule even though the initial problem is altered during the course of the attack, as by a change in course or speed of the submarine or destroyer. For instance, if the submarine should change its course, it is necessary to recalculate the course angle $\psi$, reset the position of index line 3 on scale 2, and to reset the range scale 7 to maintain the same readings of relative bearing and the range, which are not immediately changed by such an alteration in course. If, however, the course angle $\psi$ is changed because of an alteration of the destroyer's course, it will be necessary to reset the relative bearing (pointer line 4 on scale 1) and the range (the intersection of range line 6 and plot 5) as well as the course angle $\psi$ (the intersection of index line 3 with scale 2). It is thus seen that these operations differ in that the relative bearing of the submarine changes only when the course angle $\psi$ is altered because of an alteration in the course of the destroyer.

If, as has been mentioned, the speed of either the destroyer or submarine is changed, new settings cannot be made with the particular vector calculating rule illustrated in the figures. In this case, it will be necessary to use a vector calculating rule with either multiple course angle scales 2 or a sliding course angle scale as has been heretofore described.

The discussion thus far has illustrated the use of the vector calculating rule only with an attack training device. As will be obvious, it also can serve a very useful purpose in actual attacks to predict the situation which will exist subsequently in the attack and to check the accuracy of the assumptions made in the initial stage of the attack. For example, if as an attack progresses, the relative readings of range, range rate and relative bearing do not correspond to those predicted by the vector calculating rule without shifting range scale 7 radially, it is immediately known that either the original information on which the attack procedure was predicated was false, or that the submarine has altered its course or speed.

Other uses can also be made of the vector calculating rule. For example, in an actual attack, it is possible for the destroyer to determine approximately what lead angle $\theta_0$ it must turn through in order that the submarine will be brought to some predetermined position with respect to the destroyer, the vector velocities and initial range being known. Conversely, if these same initial facts are known, it is possible to quickly determine whether, if a given lead angle $\theta_0$ is applied, the submarine and destroyer will ever occupy positions, relative to one another, where a successful attack may be launched.

It is thus seen that the particular vector calculating rule described herein is very useful when used either in connection with the attack training device or in predicting or checking attack procedures.

As has already been stated, it involves only obvious changes to arrange the illustrated rule for general use to study the relationship between any two moving points and it is this broader application which is intended to be encompassed in the claims.

Having described the invention, I claim:

1. A vector calculating rule for determining the relationship between two points moving with respect to each other comprising: a pair of scales having centers adapted to represent the two points and separated by a distance adapted to represent the vector velocities of said points; a sheet having an index line and a plotted curve thereon rotatable about a point fixed with respect to one of said scales, said index line being adapted to intersect the other of said scales to measure the magnitude and direction of the relative velocity of said points; said plotted curve representing the distance between said points and the angular bearing of one with respect to the direction of motion of the other, said sheet being mounted with said index line in superimposed relation to one of said scales.

2. A vector calculating rule for determining the relationship between two points moving with respect to each other comprising: a pair of scales having centers adapted to represent the two points and separated by a distance adapted to represent the vector velocities of said points; a sheet having an index line and a plotted curve thereon rotatable about a point fixed with respect to one of said scales, said index line being adapted to intersect the other of said scales to measure the magnitude and direction of the relative velocity of said points; said plotted curve representing the distance between said points and the angular bearing of one with respect to the direction of motion of the other; and a distance scale mounted for independent rotation about the same axis of rotation as said sheet and arranged to determine the relationship between said distance between said points and said angular bearing by its intersection with said plotted curve and the one of said pair of scales, respectively.

3. A vector calculating rule for determining the relationship between two points moving with respect to each other comprising: a pair of scales having centers adapted to represent the two points and separated by a distance adapted to represent the vector velocities of said points; a transparent sheet having an index line thereon rotatable about a point fixed with respect to one of said scales, said index line being adapted to intersect the other of said scales to measure the magnitude and direction of the relative velocity of said points; said transparent sheet having a plotted curve of the distance between said points and the angular bearing of one with respect to the direction of motion of the other, said sheet being mounted with said plotted curve and index line being in superimposed relation to one of said scales; a distance scale mounted for independent rotation about the same axis of rotation arranged to determine the relationship between said distance between said points and said angular bearing by its intersection with said plotted curve and the one of said pair of scales, respectively; and a relative velocity scale mounted for rotation with said distance scale and arranged to determine the relative velocity as represented by the distance along said velocity scale from said axis of rotation to the intersection of said index line and said other of said scales.

4. A vector calculating rule for determining the relationship between two points moving with respect to each other comprising: a pair of circular scales whose centers are adapted to represent the two points and are separated by a distance adapted to represent the vector velocity of one of said points; a radius of one of said scales arranged and adapted to represent the vector velocity of the other of said points; and a sheet having an index line thereon rotatable about the center of the other of said scales with said index line intersecting the outer tip of said radius to measure the magnitude and direction of the relative velocity of said points.

5. A vector calculating rule for determining the relationship between two points moving with respect to each other comprising: a pair of circular scales whose centers are adapted to represent the two points and are separated by a distance adapted to represent the vector velocity of one of said points; a radius of one of said scales arranged and adapted to represent the vector velocity of the other of said points; a transparent sheet having an index line thereon rotatable about the center of the other of said scales with the index line intersecting the outer tip of said radius to measure the magnitude and direction of the relative velocity of said points; said sheet having a plotted curve of the distance between said points and the angular bearing of said one of said points with respect to the direction of motion of the other of said points, said sheet being mounted with said index line in superimposed relation to one of said scales.

6. A vector calculating rule for determining the relationship between two points moving with respect to each other comprising: a pair of circular scales whose centers are adapted to represent the two points and are separated by a distance adapted to represent the vector velocity of one of said points; a radius of one of said scales arranged and adapted to represent the vector velocity of the other of said points; a transparent sheet having an index line thereon rotatable about the center of the other of said scales with the index line intersecting the outer tip of said radius to measure the magnitude and direction of the relative velocity of said points; said transparent sheet having a plotted curve of the distance between said points and the angular bearing of said one of said points with respect to the direction of motion of the other of said points whereby said plotted curve is mounted for rotation with said index line; and a distance scale mounted for independent rotation about the center of said other scale in operative relation to said plotted curve and said first scale to determine by intersection therewith the relationship between said distance between said points and said angular bearing, respectively.

7. A vector calculating rule for determining the relationship between two points moving with respect to each other comprising: a pair of circular scales whose centers are adapted to represent the two points and are separated by a distance adapted to represent the vector velocity of one of said points; a radius of one of said scales arranged and adapted to represent the vector velocity of the other of said points; a sheet having an index line thereon rotatable about the center of the other of said scales with the index line intersecting the outer tip of said radius to measure the magnitude and direction of the relative velocity of said points; said sheet having a plotted curve of the distance between said points and the angular bearing of said one of said points with respect to the direction of motion of the other of said points, whereby said plotted curve is mounted for rotation with said index line; a distance scale mounted for independent rotation about the center of said other scale in operative relation to said plotted curve and said first scale to determine by intersection therewith the relationship between said distance between said points and said angular bearing, respectively; and a relative velocity scale mounted for rotation with said distance scale in superimposed relation to said radius and said index line to determine the relative velocity as represented by the distance along said velocity scale from the center of said first scale to the intersection of said index line and said outer tip of said radius.

8. A vector calculating rule for determining the relationship between two relatively moving points comprising: a disk, a first circular scale mounted upon the disk, a second circular scale mounted upon the disk, the centers of the said scales representing the said two points and being separated by a distance representing the vector velocity of one of said points, the radius of said second scale representing the vector velocity of the other of the said points, a transparent sheet having an index line thereon, said sheet being rotatable about the center of said first scale with said index line in superimposed relation to said second scale, said transparent sheet having a plotted curve representing the distance between said points and the angular bearing of one of said points with respect to the direction of motion of the other of said points, whereby said plotted curve is mounted for rotation with said index line, a distance scale mounted for independent rotation about the center of said first scale in superimposed relation with said plotted curve and said first scale and coacting with said plotted curve and said first scale to determine the relationship of said distance between said points and said angular bearing, and a relative velocity scale mounted for rotation with said distance scale in operative relation with said index line and said radius to determine the relative velocity of the said points.

References Cited in the file of this patent

UNITED STATES PATENTS

| | | |
|---|---|---|
| 1,560,747 | Weinbach | Nov. 10, 1925 |
| 1,629,227 | Ruspoli | May 17, 1927 |
| 2,099,713 | Wilson | Nov. 23, 1937 |
| 2,370,753 | Reece | Mar. 6, 1945 |
| 2,419,203 | Edwards | Apr. 22, 1947 |